Patented Mar. 13, 1923.

1,448,091

UNITED STATES PATENT OFFICE.

PAUL C. SEEL, OF ROCHESTER, NEW YORK, ASSIGNOR TO EASTMAN KODAK COMPANY, OF ROCHESTER, NEW YORK, A CORPORATION OF NEW YORK.

PURIFICATION OF CELLULOSE ETHER.

No Drawing.     Application filed February 2, 1922.   Serial No. 533,658.

*To all whom it may concern:*

Be it known that I, PAUL C. SEEL, a citizen of the United States of America, residing at Rochester, in the county of Monroe and State of New York, have invented certain new and useful Improvements in Purification of Cellulose Ether, of which the following is a full, clear, and exact specification.

The invention relates to a process of purifying ethers of cellulose. One object of the invention is to provide an inexpensive process of purifying cellulose ethers, which will be rapid in action and yield a product of improved quality. Another object of my invention is to provide a process which readily removes metallic salts from the ethers. Still another object of my invention is to provide a process which reduces the so-called haze in films formed from such ethers. Still another object of my invention is to provide a process which will accomplish the foregoing results and at the same time remove the last traces of alkali without injuring the strength of films made from the resulting product. Other objects will hereinafter appear.

I have discovered that cellulose ethers obtained by the known methods may be advantageously purified by treating them with dilute nitric acid and then removing the latter. I have found that this acid has a specific effect which is unexpectedly superior to that obtained when sulfuric acid is employed.

Purely by way of illustration, I shall now describe one example of my invention, but it will be understood that many variations may be made therein without departing from the spirit of the invention as defined in the appended claims. Precipitated cellulose ethers, such for example as ethyl celluloses which are substantially insoluble in water at room temperature, produced by any of the known methods, are immersed in or otherwise fluid treated with sufficient dilute nitric acid, say from 1 to 20 percent strength, until said acid has thoroughly penetrated to all of the particles of the ether. I prefer a 5 percent solution by weight. When the acid has thus acted uniformly throughout the mass, it is washed out thoroughly by one or more extractions with water. For instance, the mass may be repeatedly sprayed with water and then subjected to pressure to squeeze out the water.

When the resulting purified ethers are made up into transparent films, the latter tend to be clearer and free from a slight veiling or so-called haze, such as heretofore some times caused difficulty. The nitrates of certain metals, such as calcium for instance, are much more readily soluble and washed out than the corresponding sulfates. Possibly this is one of the reasons why nitric acid has unexpectedly proven to be a superior purifying agent.

When the process is applied to ethers which are soluble in cold water, but insoluble in warm or hot water, the dilute acid and the subsequent aqueous washing baths are kept at such a temperature that harmful solution and consequent losses of the ether are prevented. When the ethers are insoluble in cold water, or even in water at room temperature, then the special heating of the acid and water is not necessary.

Having thus described my invention, what I claim as new and desire to secure by Letters Patent is:

1. The process of purifying cellulose ether, which comprises the steps of treating said ether with dilute nitric acid and then substantially removing the latter.

2. The process of purifying cellulose ether substantially insoluble in water at room temperature, which comprises the steps of washing said ether in an aqueous solution of nitric acid of 1 to 20 per cent strength, and then substantially removing said acid by washing with water.

Signed at Rochester, New York, this 23rd day of January 1922.

PAUL C. SEEL.